United States Patent [19]
Bastarache

[11] Patent Number: 5,899,021
[45] Date of Patent: May 4, 1999

[54] AWNING WINDOW

[76] Inventor: Hubert J. Bastarache, 59 Regan St., Gardner, Mass. 01440

[21] Appl. No.: 08/891,397

[22] Filed: Jul. 10, 1997

[51] Int. Cl.⁶ ..................................................... E05F 11/24
[52] U.S. Cl. .................................... 49/341; 49/31; 49/26; 49/139; 49/346
[58] Field of Search ............................. 49/31, 139, 140, 49/324, 339, 340, 341, 346, 26, 28

[56] References Cited

U.S. PATENT DOCUMENTS

| | | | |
|---|---|---|---|
| 2,397,754 | 4/1946 | Sawyer | 49/346 |
| 2,819,065 | 11/1958 | Jones | 49/341 X |
| 3,508,362 | 4/1970 | Wright | 49/340 |
| 3,667,161 | 6/1972 | Sassano | 49/346 X |
| 5,225,748 | 7/1993 | Haring | 49/31 X |
| 5,313,737 | 5/1994 | Midas | 49/340 X |
| 5,605,013 | 2/1997 | Hogston | 49/31 |

*Primary Examiner*—Jerry Redman

[57] ABSTRACT

An AWNING WINDOW is provided including a window sill and a window having a sash. Also provided is a window control assembly including a dowel situated within a recess formed in the window sill. The dowel has at least one generally L-shaped arm having a first portion coupled to the dowel. A large gear is concentrically coupled at a central extent of the dowel. A motor is coupled to the top face of the window sill with a small gear coupled to a rotor thereof for engaging the large gear thereby rotating the dowel upon the receipt of power. At least one sleeve is coupled along the one of the side borders of the sash of the window. At least one slider slidably is situated within the sleeve and pivotally coupled with an end of a second portion of the at least one L-shaped arm. By this structure, the window is raised upon the receipt of voltage of a first polarity and lowered upon the receipt of voltage of a second polarity.

7 Claims, 3 Drawing Sheets

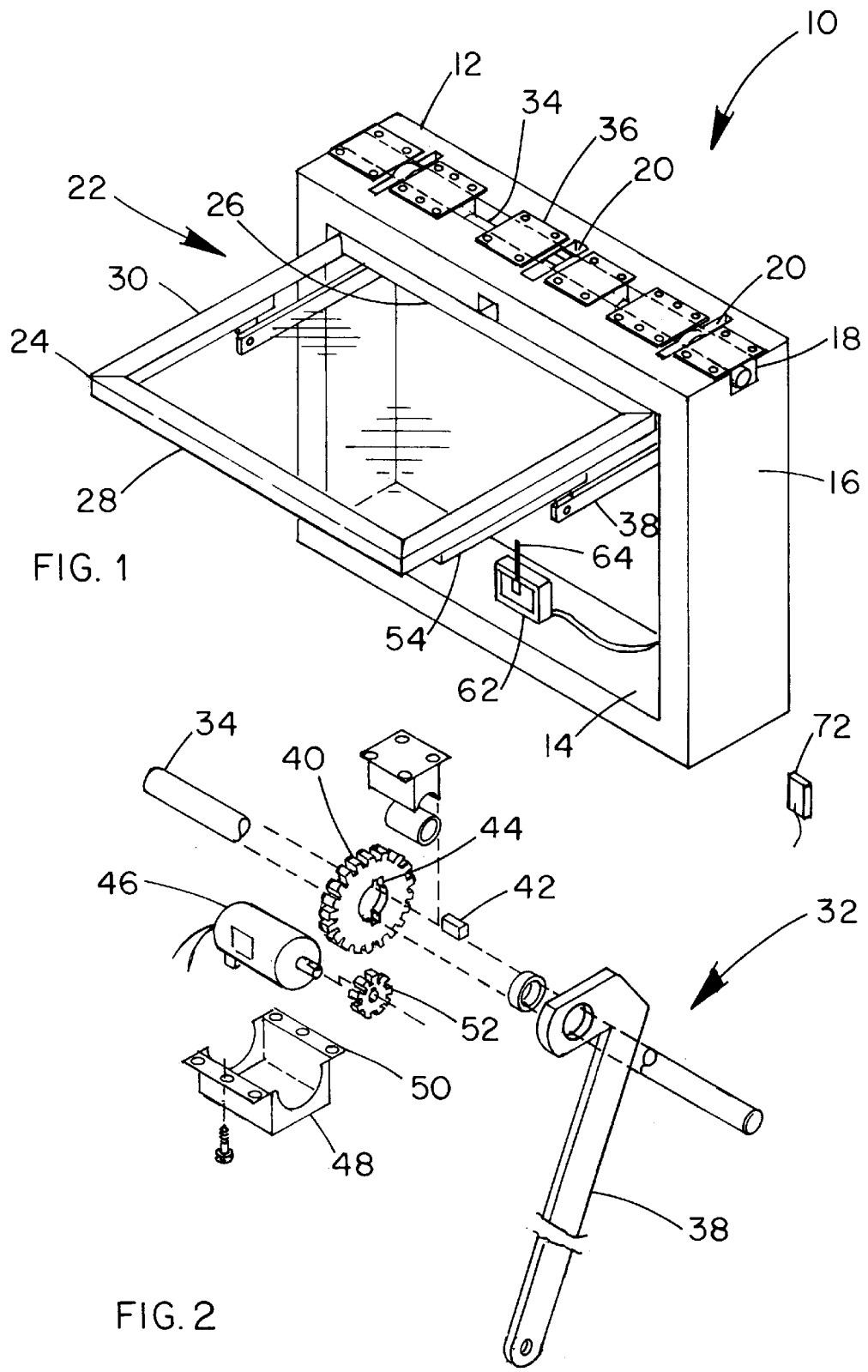

AWNING WINDOW

BACKGROUND OF THE INVENTION

1. Field of the Invention

The present invention relates to automatic windows and more particularly pertains to a new AWNING WINDOW for opening and closing a window that is out of reach.

2. Description of the Prior Art

The use of automatic windows is known in the prior art. More specifically, automatic windows heretofore devised and utilized are known to consist basically of familiar, expected and obvious structural configurations, notwithstanding the myriad of designs encompassed by the crowded prior art which have been developed for the fulfillment of countless objectives and requirements.

Known prior art automatic windows include U.S. Pat. No. 5,313,737; U.S. Pat. No. 5,004,961; U.S. Pat. No. 4,945,678; U.S. Pat. No. 5,315,194; U.S. Pat. No. 5,4110,226; and U.S. Pat. No. 5,449,987.

In these respects, the AWNING WINDOW according to the present invention substantially departs from the conventional concepts and designs of the prior art, and in so doing provides an apparatus primarily developed for the purpose of opening and closing a window that is out of reach.

SUMMARY OF THE INVENTION

In view of the foregoing disadvantages inherent in the known types of automatic windows now present in the prior art, the present invention provides a new AWNING WINDOW construction wherein the same can be utilized for opening and closing a window that is out of reach.

The general purpose of the present invention, which will be described subsequently in greater detail, is to provide a new AWNING WINDOW apparatus and method which has many of the advantages of the automatic windows mentioned heretofore and many novel features that result in a new AWNING WINDOW which is not anticipated, rendered obvious, suggested, or even implied by any of the prior art automatic windows, either alone or in any combination thereof.

To attain this, the present invention generally comprises a window sill is included with a horizontal top face, a horizontal bottom face, and a pair of vertical side faces defining an open front and an open rear. Note FIG. 1. The window sill has an elongated rectangular recess formed on an upper surface of the top face between the side faces thereof. A plurality of vertical slots are formed between the upper surface and a lower surface of the top face of the window sill in perpendicular relationship with the rectangular recess. With reference still to FIG. 1, a window is included having a sash comprising a top border, a bottom border, and a pair of side borders. The top border of the sash is hingably coupled to the lower surface of the top face of the window sill adjacent the open front thereof. For raising and lowering the window, a window control assembly is provided. Note FIGS. 2 & 3. Such window control assembly includes a dowel situated within the rectangular recess of the window sill with a plurality of fasteners for maintaining the dowel therein. The dowel has a pair of generally L-shaped arms each having a short portion coupled to the dowel and movably situated within an associated one of the vertical slots of the window sill. By this structure, the window control assembly is adapted to allow the coincident raising and lowering of the arms upon the rotation of the dowel. Further provided as a component of the window control assembly is a large gear concentrically coupled at a central extent of the dowel and movably situated within an associated one of the vertical slots of the window sill. As shown in FIG. 3, the large gear extends downwardly through the lower surface of the top face of the window sill. A motor is coupled to the lower surface of the top face of the window sill with a small gear coupled to a rotor thereof. Such small gear is adapted for engaging the large gear thereby rotating the dowel upon the receipt of power by the motor. As best shown in FIG. 4, a pair of T-shaped sleeves coupled along the side borders of the sash of the window. Associated therewith is a pair of T-shaped sliders each slidably situated within an associated one of the T-shaped sleeves with a tab extending downwardly therefrom. This tab is equipped for pivotally coupling with an end of a long portion of an associated one of the L-shaped arms. As such, the window is raised upon the receipt of voltage of a first polarity and lowered upon the receipt of voltage of a second polarity. Next provided is wind switch means situated on the bottom face of the window sill adjacent the open rear thereof. In use, the wind switch means is adapted for providing a wind signal upon the detection of wind with a predetermined amount of force. Further included is manual control means in communication with the motor and a power source. In operation, the manual control means transmits a voltage of the first polarity to the motor in a first orientation thereof and transmits a voltage of the second polarity in a second orientation thereof. Further, the manual control means is adapted to preclude the transmission of a voltage in a third orientation thereof. Connected between the power source and the manual control means is obstruction detection and deactivation means. Such means is capable of preventing the flow of current between the power source and the manual control means upon the detection of a current which exceeds a predetermined amount. The excessive current is the result of an obstruction to the movement of raising and lowering of the window. Finally, mode selection means is connected between the manual control means, wind switch means, and motor. In use, the mode selection means is adapted to connect the motor only with the manual control means upon the lack of receipt of the wind signal and to connect the motor with the power source such that a voltage of the second polarity is unconditionally supplied thereto thereby lowering the window.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new AWNING WINDOW apparatus and method which has many of the advantages of the automatic windows mentioned heretofore and many novel features that result in a new AWNING WINDOW which is not anticipated, rendered obvious, suggested, or even implied by any of the prior art automatic windows, either alone or in any combination thereof.

It is another object of the present invention to provide a new AWNING WINDOW which may be easily and efficiently manufactured and marketed.

It is a further object of the present invention to provide a new AWNING WINDOW which is of a durable and reliable construction.

An even further object of the present invention is to provide a new AWNING WINDOW which is susceptible of a low cost of manufacture with regard to both materials and labor, and which accordingly is then susceptible of low prices of sale to the consuming public, thereby making such AWNING WINDOW economically available to the buying public.

Still yet another object of the present invention is to provide a new AWNING WINDOW which provides in the apparatuses and methods of the prior art some of the advantages thereof, while simultaneously overcoming some of the disadvantages normally associated therewith.

Still another object of the present invention is to provide a new AWNING WINDOW for opening and closing a window that is out of reach.

Even still another object of the present invention is to provide a new AWNING WINDOW that includes a window sill and a window having a sash. Also provided is a window control assembly including a dowel situated within a recess formed in the window sill. The dowel has at least one generally L-shaped arm having a first portion coupled to the dowel. A large gear is concentrically coupled at a central extent of the dowel. A motor is coupled to the top face of the window sill with a small gear coupled to a rotor thereof for engaging the large gear thereby rotating the dowel upon the receipt of power. At least one sleeve is coupled along the one of the side borders of the sash of the window. At least one slider slidably is situated within the sleeve and pivotally coupled with an end of a second portion of the at least one L-shaped arm. By this structure, the window is raised upon the receipt of voltage of a first polarity and lowered upon the receipt of voltage of a second polarity.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new AWNING WINDOW according to the present invention.

FIG. 2 is an exploded view of the window control assembly of the present invention.

DESCRIPTION OF THE PREFERRED EMBODIMENT

Figure 3:
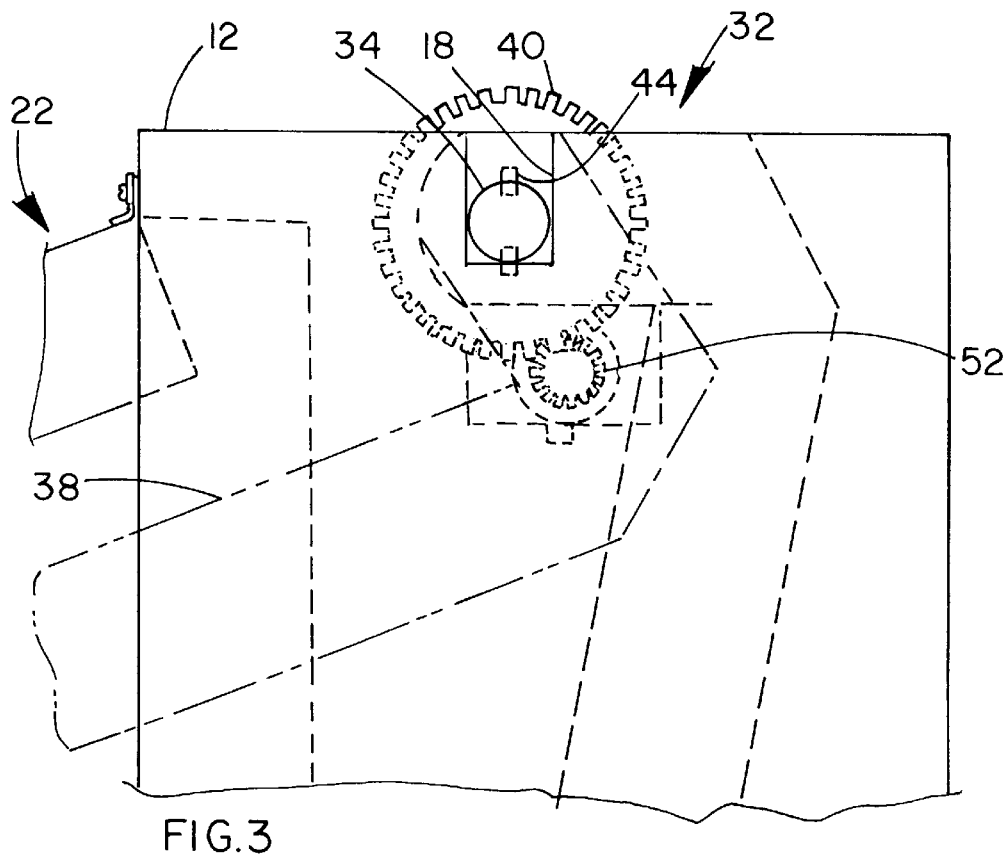
FIG. 3 is a side cross-sectional view of the window control assembly of the present invention.

With reference now to the drawings, a new AWNING WINDOW embodying the principles and concepts of the present invention and generally designated by the reference numeral 10 will be described.

Specifically, a window sill 10 is included with a horizontal top face 12, a horizontal bottom face 14, and a pair of vertical side faces 16 defining an open front and an open rear. Note FIG. 1. The window sill has an elongated rectangular recess 18 formed on an upper surface of the top face between the side faces thereof. A plurality of vertical slots 20 are formed between the upper surface and a lower surface of the top face of the window sill in perpendicular relationship with the rectangular recess. In the preferred embodiment, a total of three vertical slots are provided.

With reference still to FIG. 1, a window 22 is included having a sash 24 comprising a top border 26, a bottom border 28, and a pair of side borders 30. The top border of the sash is hingably coupled to the lower surface of the top face of the window sill adjacent the open front thereof. As shown in FIG. 3, the hingable coupling is afforded by way of a hinge or the like. Further, it is preferred that the window reside within a recess formed in the window sill when closed.

For raising and lowering the window, a window control assembly 32 is provided. Note FIGS. 2 & 3. Such window control assembly includes a dowel 34 situated within the rectangular recess of the window sill with a plurality of fasteners 36 for maintaining the dowel therein. Such fasteners preferably comprise of a planar top portion with a block coupled to a bottom portion thereof with an arcuate cut out formed therein. As will become apparent later, the fasteners are adapted for precluding lateral movement of the dowel. As shown in the Figures, the dowel extends along the entire length of the window sill. The planar top portion is ideally screwably coupled to the top face of the window sill. The dowel has a pair of generally L-shaped arms 38 each having a short portion coupled to the dowel and movably situated within an associated one of the vertical slots of the window sill. By this structure, the window control assembly is adapted to allow the coincident raising and lowering of the arms upon the rotation of the dowel.

Figure 4:
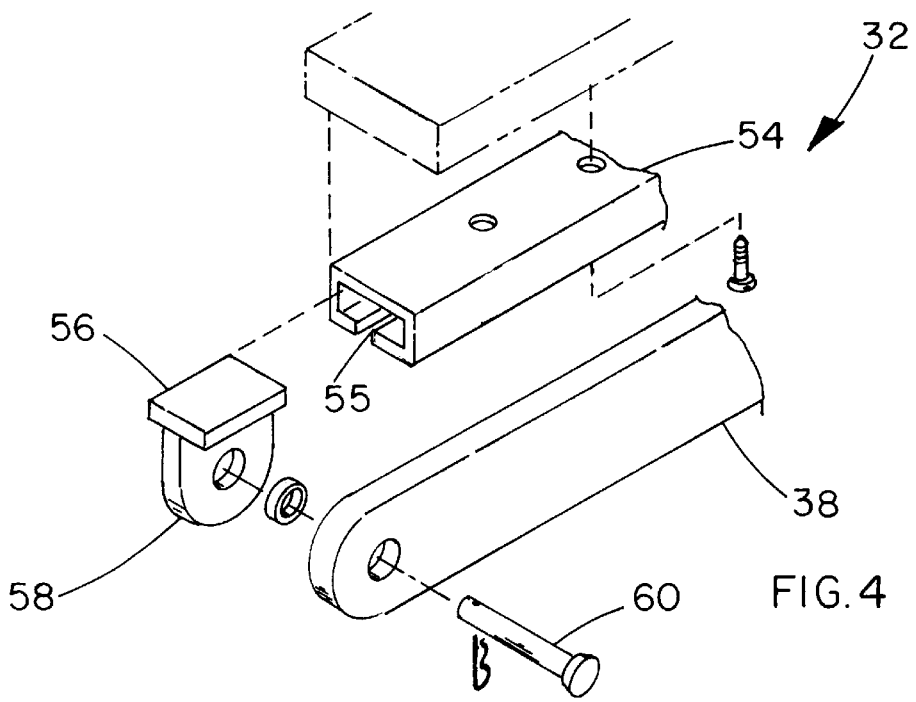
FIG. 4 is an exploded view of a portion of the window control assembly of the present invention.

Further provided as a component of the window control assembly is a large gear 40 concentrically coupled at a central extent of the dowel and movably situated within an associated one of the vertical slots of the window sill. Such coupling is preferably afforded via at least one small block 42 inserted within a groove 44 in the gear. The block works in conjunction with a bushing to maintain the large gear fixed in relation with the dowel. As shown in FIG. 3, the large gear extends downwardly through the lower surface of the top face of the window sill. A motor 46 is coupled to the lower surface of the top face of the window sill with a small gear coupled to a rotor thereof. The motor is mounted within a housing 48 with an open top having a pair of flanges 50 extending outwardly therefrom for coupling with the top face of the window sill, as shown in FIG. 2. The small gear 52 of the motor is adapted for engaging the large gear thereby rotating the dowel upon the receipt of power by the motor. As best shown in FIG. 4, a pair of T-shaped sleeves 54 are screwably coupled along the side borders of the sash of the window. Each T-shaped sleeve has bottom slot 55 formed therein. Associated with the T-shaped sleeves is a pair of T-shaped sliders 56 each slidably situated within an associated one of the T-shaped sleeves with a tab 58 extending downwardly therefrom through the slot of the sleeve. This tab is equipped for pivotally coupling with an end of a long portion of an associated one of the L-shaped arms by way of a pivot pin 60. As such, the window is raised upon the receipt of voltage of a first polarity by the motor and lowered upon the receipt of voltage of a second polarity by the motor.

Next provided is wind switch means 62 situated on the bottom face of the window sill adjacent the open rear thereof. In use, the wind switch means is adapted for providing a wind signal upon the detection of wind with a predetermined amount of force. As shown in FIG. 1, the wind switch includes a housing with a flag 64 extending upwardly therefrom. The flag is adapted to be biased or bent upon the application of wind. Such flag is in turn connected to a switch located within the housing. The switch is coupled to a non-retriggerable one shot multivibrator 66. For reasons that will become apparent later, the wind signal is preferably of a duration equal to that which it takes for the window to be closed.

Further included is manual control means 68 in communication with the motor and a power source 70. Note FIG. 5. In operation, the manual control means transmits a voltage of the first polarity to the motor in a first orientation thereof and transmits a voltage of the second polarity in a second orientation thereof. Further, the manual control means is adapted to preclude the transmission of a voltage in a third orientation thereof. In the preferred embodiment, the manual control means comprises of a DPDT switch 72 that is adapted to be slid between the various orientations thereof. Preferably, the switch is a biased when in the first and second orientation thereof and unbiased in the third orientation thereof.

Connected between the power source and the manual control means is obstruction detection and deactivation means 74. Such means is capable of preventing the flow of current between the power source and the manual control means upon the detection of a current which exceeds a predetermined amount. The excessive current is the result of an obstruction to the movement of raising and lowering of the window. To accomplish this, the manual control means includes a current sensor 76 connected between the power source and the manual control means for detecting the current flowing therethrough. Coupled thereto is a comparator 78 for transmitting a deactivation signal upon the current detected surpassing a predetermined amount. A switch 80 is connected between the between the power source and the manual control means with an associated one-shot multivibrator 82 for precluding the supply of power during the receipt of the deactivation signal. In the preferred embodiment, the deactivation signal is transmitted for a period of approximately 20–30 seconds.

Figure 5:
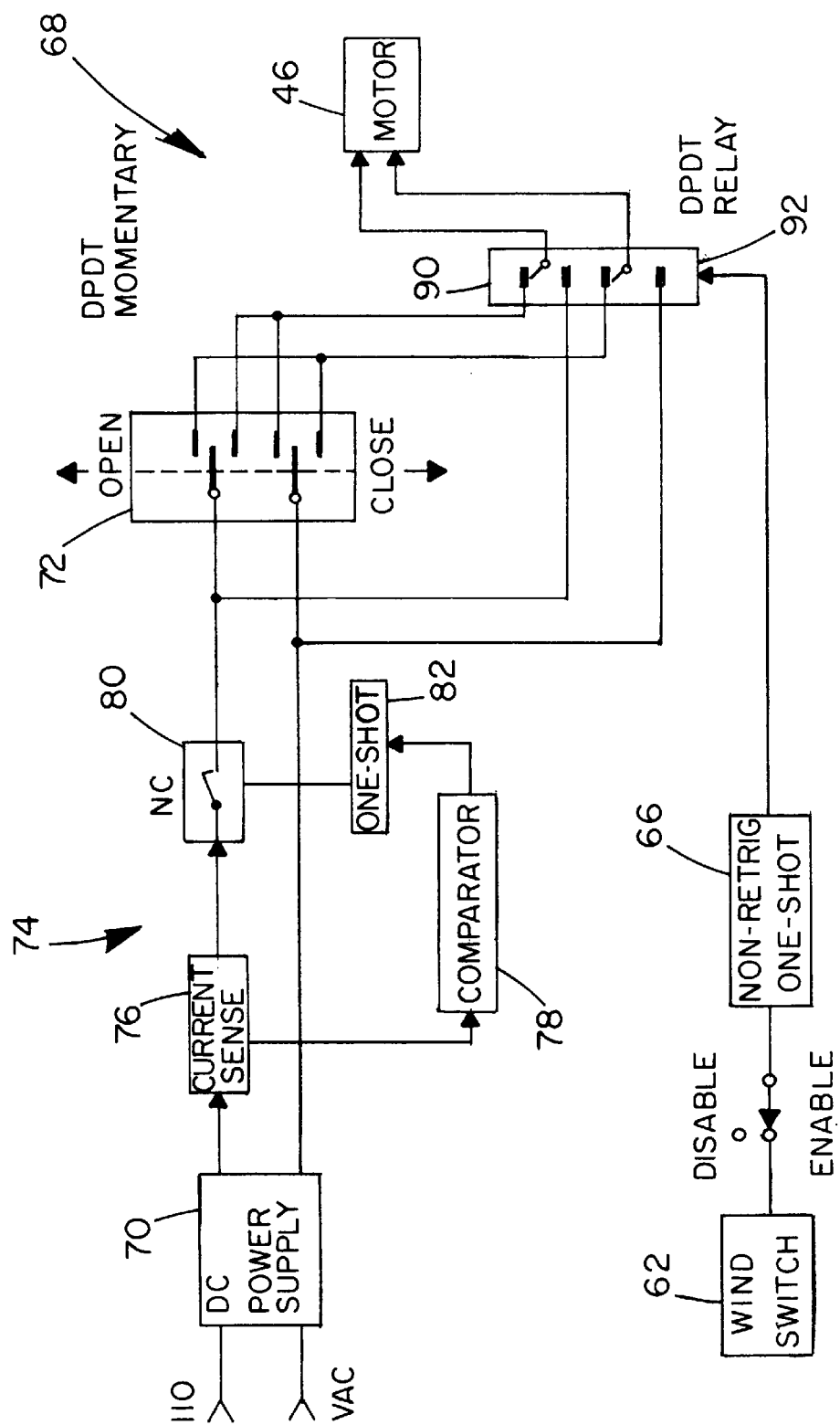
FIG. 5 is a schematic diagram depicting the various electrical components of the present invention.

Finally, mode selection means 90 is connected between the manual control means, wind switch means, and motor. In use, the mode selection means is adapted to connect the motor only with the manual control means upon the lack of receipt of the wind signal and to connect the motor with the power source only during the receipt of the wind signal such that a voltage of the second polarity is supplied thereto independent of the manual control means thereby lowering the window. As shown in FIG. 5, the mode selection means includes a DPDT relay 92.

In use, upon the closing and opening of the window, the obstruction detection and deactivation means is adapted to cease the transmission of power to the motor.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An awning window comprising, in combination:

a window sill with a horizontal top face, a horizontal bottom face, and a pair of vertical side faces defining an open front and an open rear, the window sill having an elongated rectangular recess formed on an upper surface of the top face between the side faces thereof and a plurality of vertical slots formed between the upper surface and a lower surface of the top face of the window sill in perpendicular relationship with the rectangular recess;

a window having a sash comprising a top border, a bottom border, and a pair of side borders, the top border of the sash being hingably coupled to the lower surface of the top face of the window sill adjacent the open front thereof;

a window control assembly including a dowel situated within the rectangular recess of the window sill with a plurality of fasteners for maintaining the dowel therein, the dowel having a pair of generally L-shaped arms each having a short portion coupled to the dowel and movably situated within an associated one of the vertical slots of the window sill thereby allowing the coincident raising and lowering of the arms upon the rotation of the dowel, a large gear concentrically coupled at a central extent of the dowel and movably situated within an associated one of the vertical slots of the window sill wherein the large gear extends downwardly through the lower surface of the top face of the window sill, a motor coupled to the lower surface of the top face of the window sill with a small gear coupled to a rotor thereof for engaging the large gear thereby rotating the dowel upon the receipt of power, a pair of T-shaped sleeves coupled along the side borders of the sash of the window, and a pair of T-shaped sliders each slidably situated within an associated one of the T-shaped sleeves with a tab extending downwardly therefrom for pivotally coupling with an end of a long portion of an associated one of the L-shaped arms, whereby the window is raised upon the receipt of voltage of a first polarity and lowered upon the receipt of voltage of a second polarity;

wind switch means situated on the bottom face of the window sill adjacent the open rear thereof for providing a wind signal upon the detection of wind with a predetermined amount of force;

manual control means in communication with the motor and a power source and adapted to transmit a voltage of the first polarity to the motor in a first orientation of the manual control means, to transmit a voltage of the second polarity in a second orientation of the manual control means, and to preclude the transmission of a voltage in a third orientation of the manual control means;

obstruction detection and deactivation means connected between the power source and the manual control means for preventing the flow of current between the power source and the manual control means upon the detection of a current which exceeds a predetermined amount representative of an obstruction to the movement of raising and lowering of the window; and mode selection means connected between the manual control means, wind switch means, and motor, the mode selection means adapted to connect the motor only with the manual control means upon the lack of receipt of the wind signal, the mode selection means further adapted to connect the motor with the power source such that a voltage of the second polarity is unconditionally supplied thereto thereby lowering the window upon the receipt of the wind signal;

whereby upon the closing and opening of the window, the obstruction detection and deactivation means is adapted to cease the transmission of power to the motor.

2. An awning window comprising:

a window sill with a top face, a bottom face, and a pair of side faces defining an open front and an open rear, the window sill having an recess formed in the top face between the side faces;

a window having a sash comprising a top border, a bottom border, and a pair of side borders, the top border of the sash being hingably coupled to the lower surface of the top face of the window sill adjacent the open front thereof;

a window control assembly including a dowel situated within the recess of the window sill, the dowel having at least one generally L-shaped arm having a first portion coupled to the dowel, a large gear concentrically coupled at a central extent of the dowel, a motor coupled to the top face of the window sill with a small gear coupled to a rotor thereof for engaging the large gear thereby rotating the dowel upon the receipt of power, at least one sleeve coupled along the one of the side borders of the sash of the window, and at least one slider slidably situated within the sleeve and pivotally coupled with an end of a second portion of the at least one L-shaped arm, whereby the window is raised upon the receipt of voltage of a first polarity and lowered upon the receipt of voltage of a second polarity.

3. An awning window as set forth in claim 2 and further including wind switch means situated on the window for effecting the transmission of a voltage of the second polarity to the motor upon the detection of wind.

4. An awning window as set forth in claim 2 and further including manual control means in communication with the motor and a power source and adapted to transmit a voltage of the first polarity to the motor in a first orientation of the manual control means, to transmit a voltage of the second polarity in a second orientation of the manual control means, and to preclude the transmission of a voltage in a third orientation of the manual control means.

5. An awning window as set forth in claim 2 and further including obstruction detection and deactivation means connected between the power source and the motor for preventing the flow of current between the power source and the manual control means upon the detection of a current which exceeds a predetermined amount representative of an obstruction to the movement of raising and lowering of the window.

6. An awning window as set forth in claim 2 and further including:

wind switch means for providing a wind signal upon the detection of wind with a predetermined amount of force;

manual control means in communication with the motor and a power source and adapted to transmit a voltage of the first polarity to the motor in a first orientation of the manual control means, to transmit a voltage of the second polarity in a second orientation of the manual control means, and to preclude the transmission of a voltage in a third orientation of the manual control means; and mode selection means connected between the manual control means, wind switch means, and motor, the mode selection means adapted to connect the motor only with the manual control means upon the lack of receipt of the wind signal, the mode selection means further adapted to connect the motor with the power source such that a voltage of the second polarity is unconditionally supplied thereto thereby lowering the window upon the receipt of the wind signal.

7. An awning window comprising:

a window sill with a top face, a bottom face, and a pair of side faces defining an open front and an open rear, the window sill having an recess formed in the top face between the side faces;

a window having a sash comprising a top border, a bottom border, and a pair of side borders, the top border of the sash being hingably coupled to the lower surface of the top face of the window sill adjacent the open front thereof;

a window control assembly including a motor adapted to raise and lower the window, whereby the window is raised upon the receipt of voltage of a first polarity and lowered upon the receipt of voltage of a second polarity;

wind switch means situated on the bottom face of the window sill adjacent the open rear thereof for providing a wind signal upon the detection of wind with a predetermined amount of force;

manual control means in communication with the motor and a power source and adapted to transmit a voltage of the first polarity to the motor in a first orientation of the manual control means, to transmit a voltage of the second polarity in a second orientation of the manual control means, and to preclude the transmission of a voltage in a third orientation of the manual control means;

obstruction detection and deactivation means connected between the power source and the manual control means for preventing the flow of current between the power source and the manual control means upon the detection of a current which exceeds a predetermined amount representative of an obstruction to the movement of raising and lowering of the window; and mode selection means connected between the manual control means, wind switch means, and motor, the mode selection means adapted to connect the motor only with the manual control means upon the lack of receipt of the wind signal, the mode selection means further adapted to connect the motor with the power source such that a voltage of the second polarity is unconditionally supplied thereto thereby lowering the window upon the receipt of the wind signal;

whereby upon the closing and opening of the window, the obstruction detection and deactivation means is adapted to cease the transmission of power to the motor.

* * * * *